(12) United States Patent
Jung et al.

(10) Patent No.: US 7,038,120 B2
(45) Date of Patent: May 2, 2006

(54) METHOD AND APPARATUS FOR DESIGNATING PERFORMANCE NOTES BASED ON SYNCHRONIZATION INFORMATION

(75) Inventors: Doill Jung, Seoul (KR); Gi-Hoon Kang, Seoul (KR); Yong-Woo Jeon, Seoul (KR)

(73) Assignee: Amusetec Co., Ltd., (KR)

( * ) Notice: Subject to any disclaimer, the term of this patent is extended or adjusted under 35 U.S.C. 154(b) by 210 days.

(21) Appl. No.: 10/482,180

(22) PCT Filed: Jun. 24, 2002

(86) PCT No.: PCT/KR02/01193

§ 371 (c)(1),
(2), (4) Date: Dec. 24, 2003

(87) PCT Pub. No.: WO03/001500

PCT Pub. Date: Jan. 3, 2003

(65) Prior Publication Data

US 2004/0182229 A1    Sep. 23, 2004

(30) Foreign Application Priority Data

Jun. 25, 2001 (KR) ............................. 2001-36405

(51) Int. Cl.
*G04B 13/00* (2006.01)
*G10H 7/00* (2006.01)

(52) U.S. Cl. .................. 84/609; 84/645; 84/477 R

(58) Field of Classification Search ............ 84/645, 84/477 R, 483.2, 609, 470 R
See application file for complete search history.

(56) References Cited

U.S. PATENT DOCUMENTS 6,156,964 A    12/2000   Sahai et al. ............... 84/470 R
6,235,979 B1 *  5/2001   Yanase ..................... 84/477 R
6,313,387 B1 * 11/2001   Yamauchi ................... 84/609
6,798,427 B1 *  9/2004   Suzuki et al. ............... 84/604

FOREIGN PATENT DOCUMENTS

JP    5-27670       2/1993
JP    10-240117     9/1998
JP    2000-338965  12/2000

OTHER PUBLICATIONS

PCT International Search Report, International application No. PCT/KR02/01193; International Filing date: Jun. 24, 2002; Mailing date: Oct. 22, 2002.
PCT International Preliminary Examination Report; International application No. PCT/KR02/01193; International filing date: Jun. 24, 2002; Date of Completion: Oct. 9, 2003.

* cited by examiner

*Primary Examiner*—Jeffrey W Donels
(74) *Attorney, Agent, or Firm*—Cantor Colburn LLP

(57) ABSTRACT

Method and apparatus for designating performing notes based on synchronization information are provided. After detecting meta score information from a musical score or MIDI (Musical Instrument Digital Interface) data to be performed, note position information for all notes included in an electronic score is generated based on the musical score or the meta score information. By utilizing the note position information and synchronization information, which includes the sync performance time at which each note is to start to be performed, performing notes are designated on the electronic score at each time synchronized. The synchronization information may be generated from the meta score information or the MIDI data, or may be read from a synchronization information file stored in advance. Alternatively, the synchronization information may be generated in real time by analyzing live input sound.

26 Claims, 21 Drawing Sheets

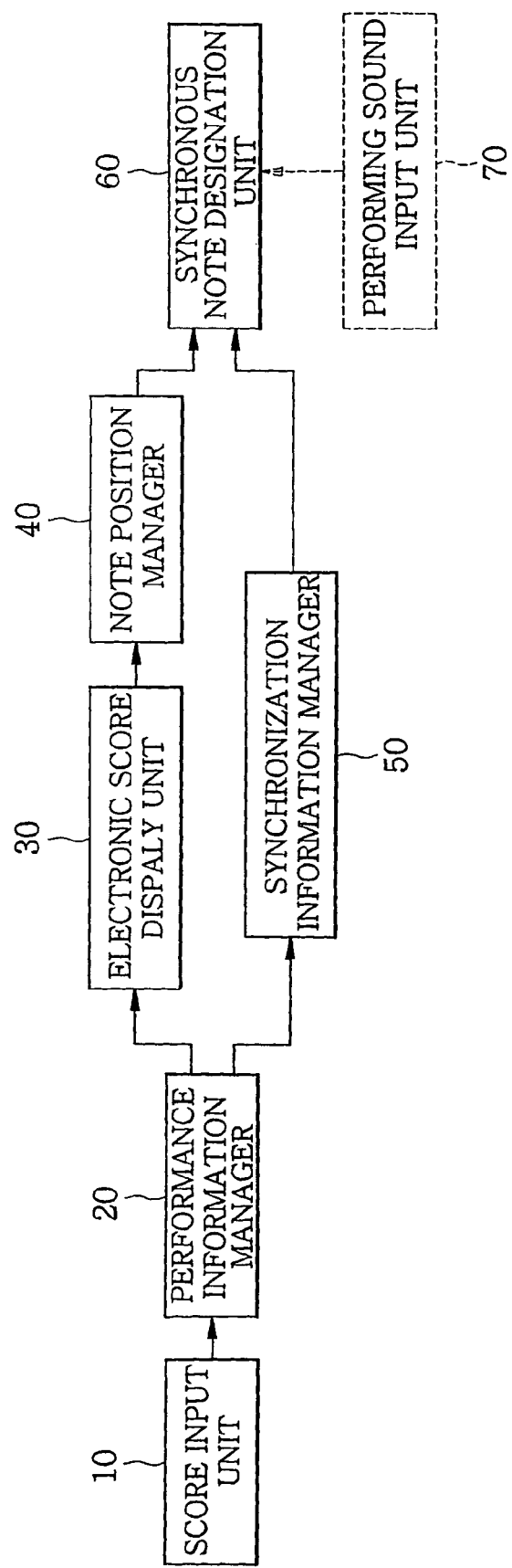

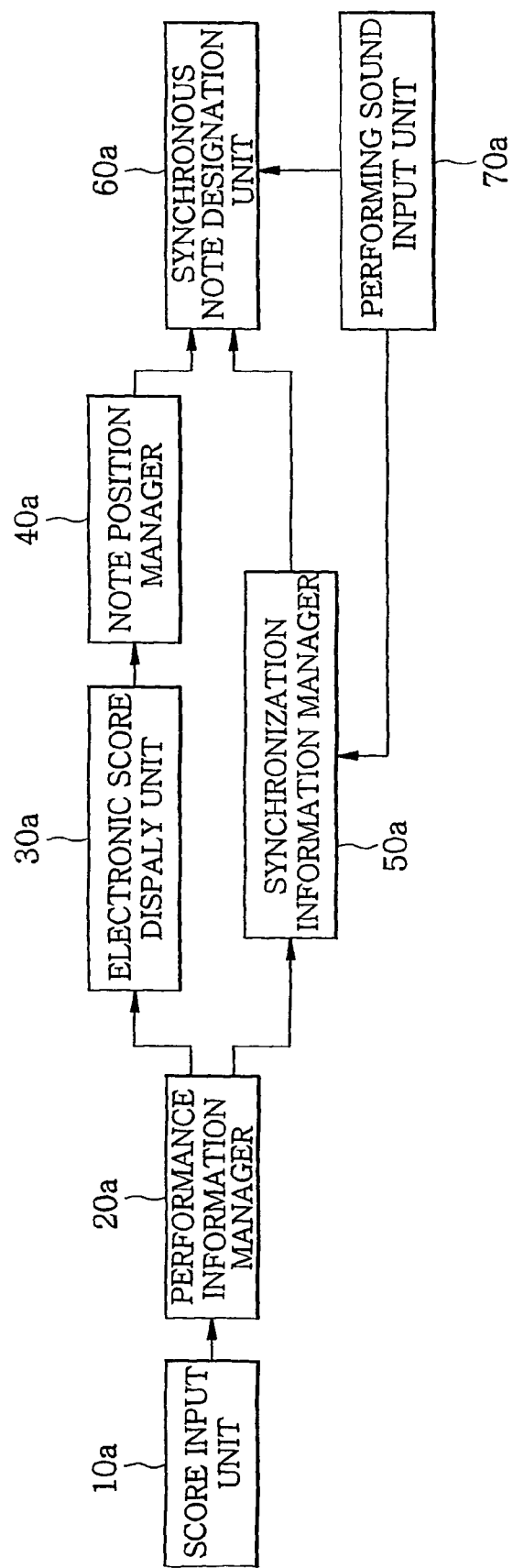

FIG.6B

| META SCORE TIME | META SCORE NOTE ID | NOTE LENGTH |
|---|---|---|
| 1:00 | 74(D5) | 64(1/4 NOTE) |
| 1:64 | 67(G4) | 32(1/8 NOTE) |
| 1:96 | 69(A4) | 32(1/8 NOTE) |
| 1:128 | 71(B4) | 32(1/8 NOTE) |
| 1:160 | 72(C5) | 32(1/8 NOTE) |
| 2:00 | 74(D5) | 64(1/4 NOTE) |
| ... | ... | ... |

FIG.6C

| META SCORE TIME | META SCORE NOTE ID | NOTE LENGTH |
|---|---|---|
| 1:00 | 59(B3) | 128(1/2 NOTE) |
| 1:00 | 55(G3) | 128(1/2 NOTE) |
| 1:128 | 57(A3) | 64(1/8 NOTE) |
| 2:00 | 59(B3) | 192(3/4 NOTE) |
| ... | ... | ... |

FIG.6E

| META SCORE TIME | META SCORE NOTE ID | X-COORDINATE | Y-COORDINATE |
|---|---|---|---|
| 1:00 | 74(D5) | 150 | 90 |
| 1:00 | 59(B3) | 150 | 150 |
| 1:00 | 55(G3) | 150 | 156 |
| 1:64 | 67(G4) | 180 | 102 |
| 1:96 | 69(A4) | 200 | 99 |
| 1:128 | 71(B4) | 220 | 96 |
| 1:128 | 57(A3) | 220 | 153 |
| 1:160 | 72(C5) | 240 | 93 |
| ... | ... | ... | ... |

FIG.6F

| SYNC PERFORMANCE TIME | META SCORE TIME | META SCORE NOTE ID |
|---|---|---|
| 0.000 | 1:00 | 74(D5) |
| 0.000 | 1:00 | 59(B3) |
| 0.000 | 1:00 | 55(G3) |
| 1.000 | 1:64 | 67(G4) |
| 1.500 | 1:96 | 69(A4) |
| 2.000 | 1:128 | 71(B4) |
| 2.000 | 1:128 | 57(A3) |
| 2.500 | 1:160 | 72(C5) |
| ... | ... | ... |

FIG.7A

| SYNCHRONIZATION INFORMATION | | | | | |
|---|---|---|---|---|---|
| | META SCORE INFORMATION | | | NOTE POSITION INFORMATION | |
| SYNC PERFORMANCE TIME | META SCORE TIME | META SCORE NOTE ID | NOTE LENGTH | X-COORDINATE | Y-COORDINATE |
| 0.000 | 1:00 | 74(D5) | 64(1/4NOTE) | 150 | 90 |
| 0.000 | 1:00 | 59(B3) | 128(1/2NOTE) | 150 | 150 |
| 0.000 | 1:00 | 55(G3) | 128(1/2NOTE) | 150 | 156 |
| 1.000 | 1:64 | 67(G4) | 32(1/8NOTE) | 180 | 102 |
| 1.500 | 1:96 | 69(A4) | 32(1/8NOTE) | 200 | 99 |
| 2.000 | 1:128 | 71(B4) | 32(1/8NOTE) | 220 | 96 |
| 2.000 | 1:128 | 57(A3) | 64(1/4NOTE) | 220 | 153 |
| 2.500 | 1:160 | 72(C5) | 32(1/8NOTE) | 240 | 93 |
| ... | ... | ... | ... | ... | ... |

FIG.8A

| SYNCHRONIZATION INFORMATION | | | | | | REAL PERFORMING NOTE INFORMATION | |
|---|---|---|---|---|---|---|---|
| | META SCORE INFORMATION | | | NOTE POSITION INFORMATION | | | |
| SYNC PERFORMANCE TIME | META SCORE TIME | META SCORE NOTE ID | NOTE LENGTH | X-COORDINATE | Y-COORDINATE | Onset Time | PITCH |
| 0.000 | 1:00 | 74(D5) | 0.950 | 150 | 90 | 0.000 | 74(D5) |
| 0.000 | 1:00 | 59(B3) | 1.990 | 150 | 150 | – | – |
| 0.000 | 1:00 | 55(G3) | 1.990 | 150 | 156 | – | – |
| 0.950 | 1:64 | 67(G4) | 0.500 | 180 | 102 | 0.900 | 67(G4) |
| 1.450 | 1:96 | 69(A4) | 0.540 | 200 | 99 | 1.450 | 71(B4) |
| 1.990 | 1:128 | 71(B4) | 0.510 | 220 | 96 | 1.900 | 72(C5) |
| 1.990 | 1:128 | 57(A3) | 1.010 | 220 | 153 | – | – |
| 2.500 | 1:160 | 72(C5) | 0.500 | 240 | 93 | 2.500 | 72(C5) |
| ... | ... | ... | | ... | ... | ... | ... |

FIG.9A

| SYNCHRONIZATION INFORMATION | | | | | |
|---|---|---|---|---|---|
| | META SCORE INFORMATION | | | NOTE POSITION INFORMATION | |
| | NOTE POSITION INFORMATION | META SCORE NOTE ID | NOTE LENGTH | X-COORDINATE | Y-COORDINATE |
| SYNC PERFORMANCE TIME | META SCORE TIME | | | | |
| 0.000 | 1:00 | 74(D5) | 64 | 100 | 100 |
| 1.000 | 1:64 | 67(G4) | 32 | 200 | 79 |
| 1.500 | 1:96 | 69(A4) | 32 | 250 | 85 |
| 2.000 | 1:128 | 71(B4) | 32 | 300 | 91 |
| 2.500 | 1:160 | 72(C5) | 32 | 350 | 94 |

METHOD AND APPARATUS FOR DESIGNATING PERFORMANCE NOTES BASED ON SYNCHRONIZATION INFORMATION

TECHNICAL FIELD

The present invention relates to a method and apparatus for displaying performing notes, and more particularly, to a method and apparatus for designating performing notes on an electronic score in real time based on synchronization information between a musical score and performing sound.

BACKGROUND ART

Usually, musical training is performed using teaching materials including musical scores with comments and recording media, for example, tapes and compact discs. More specifically, a trainee takes musical training by repeatedly performing a series of steps of listening to music reproduced from a recording medium, performing the music according to a musical score, and recording the performed music to check.

In the meantime, when trainees take musical training by listening to music reproduced from recording media while watching the musical score. Here, by simultaneously stimulating the trainees' auditory senses and visual senses, excellent training effects can be achieved.

However, when watching a usual paper score while listening to music, a trainee may make a mistake in judging the current performance position in the musical score or may not match the acoustic music to the visual score if he/she is not good at reading the musical score.

DISCLOSURE OF THE INVENTION

In order to solve the above-described problems, it is an object of the present invention to provide a method and apparatus for designating performing notes based on synchronous information, through which meta score information is detected from a musical score or MIDI (Musical Instrument Digital Interface) data to be performed, note position information of all notes included in an electronic score are generated based on the musical score or the meta score information, and current performance positions are designated on the electronic score based on the note position information and synchronization information including meta score times at which the notes start to be performed.

To achieve the above object of the present invention, in one embodiment, there is provided a method of designating performing notes based on synchronization information. The method includes detecting meta score information from a musical score and/or MIDI data; displaying an electronic score on a screen based on the musical score or the meta score information; extracting coordinates of all notes included in the electronic score and matching the notes and their coordinates to the meta score information so as to generate note position information; generating synchronization information, which contains every note included in the meta score information and each note's corresponding sync performance time at which each of the notes is supposed to start to be performed; and designating performing notes on the electronic score based on the note position information and the synchronization information when music starts to be performed.

In another embodiment, a method of designating performing notes based on synchronization information includes a first step of detecting meta score information from a musical score and/or MIDI data; a second step of displaying an electronic score on a screen based on the musical score or the meta score information; a third step of extracting coordinates of all notes included in the electronic score and matching the notes and their coordinates to the meta score information so as to generate note position information; a fourth step of analyzing performing sound to extract current sync performance time and the pitches of real performing sound; extracting notes, which are matching up to the real performing sound, from the meta score information based on the sync performance time and the pitches; and generating synchronization information including the extracted notes and the corresponding sync performance time; and a fifth step of designating the extracted notes as current performing notes on the electronic score based on the synchronization information generated in the fourth step and the note position information generated in the third step.

To achieve the above object of the present invention, there is also provided an apparatus for designating performing notes based on synchronization information in one embodiment. The apparatus includes a score input unit which inputs score information containing the notes and their lengths in a musical score and/or MIDI data to be performed; a performance information manager which detects meta score information from the score information, stores, and manages the meta score information; an electronic score display unit which displays an electronic score on a screen based on the musical score or meta score information and extracts coordinates of all of the notes included in the electronic score; a note position manager which generates note position information by matching the notes and their coordinates extracted by the electronic score display unit to the meta score information and manages the note position information; a synchronization information manager which generates and manages synchronization information including every note included in the meta score information and each note's corresponding sync performance time at which each note is supposed to start to be performed; and a synchronous note designation unit which designates performing notes on the electronic score based on the synchronization information and the note position information upon the start of music performance.

In another embodiment, an apparatus for designating performing notes based on synchronization information includes a score input unit which inputs score information containing the notes and their lengths in a musical score and/or MIDI data to be performed; a performance information manager which detects meta score information from the score information, stores, and manages the meta score information; an electronic score display unit which displays an electronic score on a screen based on the musical score or meta score information and extracts coordinates of all of the notes included in the electronic score; a note position manager which generates note position information by matching the notes and their coordinates extracted by the electronic score display unit to the meta score information and manages the note position information; a performing sound input unit which receives performing sound; a synchronization information manager which generates and manages synchronization information including sync performance times and real performing pitches which are detected by analyzing the performing sound received through the performing sound input unit; and a synchronous note designation unit which designates performing notes on the electronic score based on the synchronization information and the note position information upon the start of music performance.

BRIEF DESCRIPTION OF THE DRAWINGS

FIG. 1 is a schematic block diagram of an apparatus for designating performing notes according to a first embodiment of the present invention.

FIG. 1A is a schematic block diagram of an apparatus for designating performing notes according to a second embodiment of the present invention.

BEST MODE FOR CARRYING OUT THE INVENTION

Figure 2:
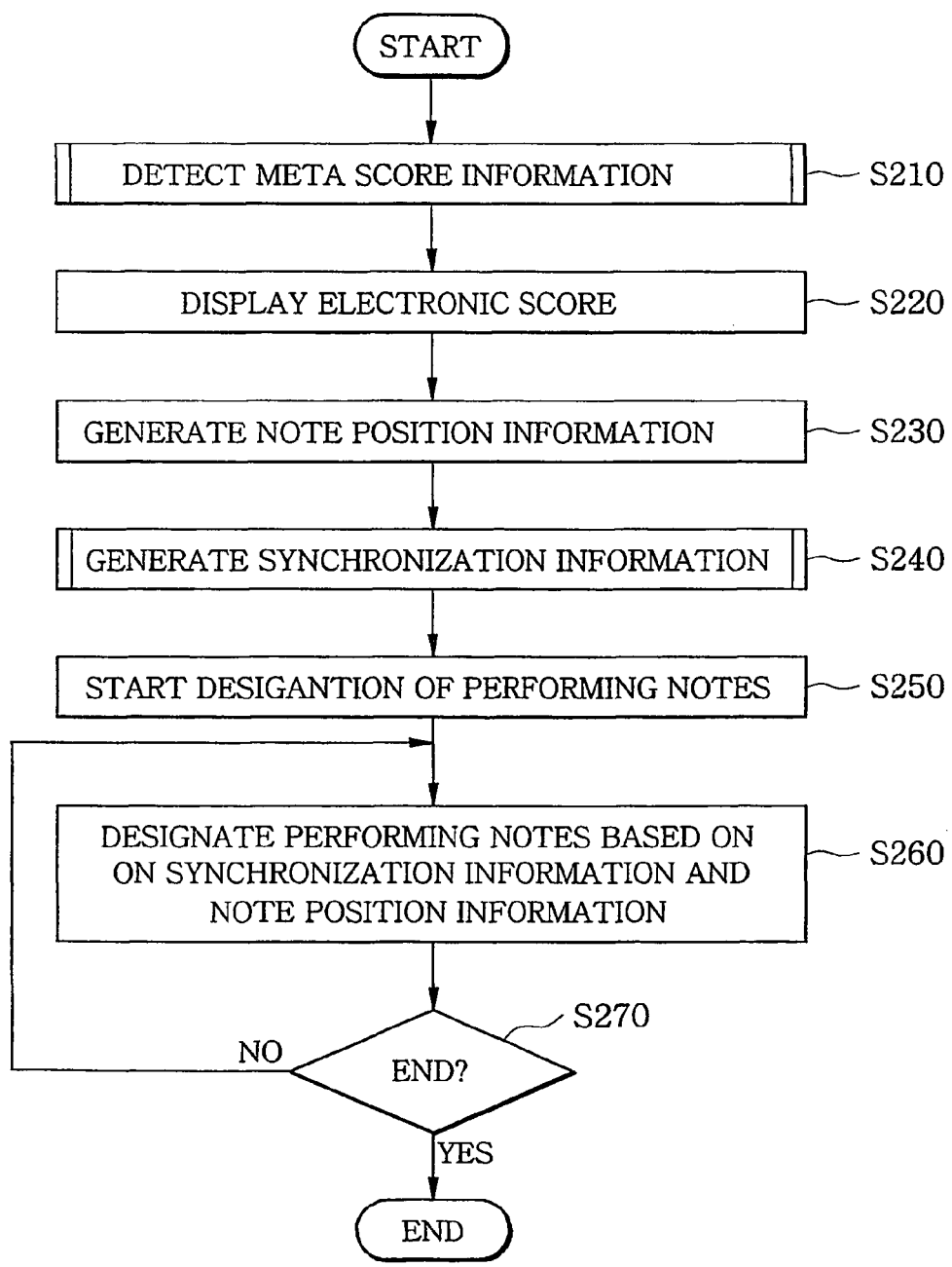
FIG. 2 is a flowchart of a method of designating performing notes according to a first embodiment of the present invention.

Hereinafter, preferred embodiments of a method and apparatus for designating performing notes based on synchronization information according to the present invention will be described in detail with reference to the attached drawings.

FIG. 1 is a schematic block diagram of an apparatus for designating performing notes according to a first embodiment of the present invention.

Referring to FIG. 1, the apparatus according to the first embodiment of the present invention includes a score input unit 10, a performance information manager 20, an electronic score display unit 30, a note position manager 40, a synchronization information manager 50, and a synchronous note designation unit 60. The apparatus selectively includes a performing sound input unit 70 for designating performing notes, which is input in real time, on an electronic score.

The score input unit 10 inputs score information containing the notes and their lengths in a musical score or MIDI (Musical Instrument Digital Interface) data to be performed. The MIDI data is performance information having a format usually used in common and is already known, and thus detailed description thereof will be omitted.

The performance information manager 20 detects meta score information from the score information, stores, and manages the meta score information. The meta score information expresses particulars, which are referred to when the musical notes are performed, according to a predetermined standard and contains a meta score time, meta score note ID, and note length of each note, as shown in FIG. 6B.

More specifically, the performance information manager 20 detects the meta score information containing the meta score note ID of each note included in the musical score or MIDI data, each note's length, and each note's meta score time, which relatively expresses a time, at which each note starts to be performed, based on note lengths that numerically express the performing lengths of the notes. The performance information manager 20 stores and manages the detected meta score information.

The following description concerns the details of the elements of the meta score information.

As shown in FIG. 6B, the meta score note ID is numerically expressed to identify a note and has pitch information. Numerical values such as 74, 67, 69, 71, 72, and 74 are used when notes within one octave are expressed by 12 numbers, respectively. Characters in parentheses beside each numerical value indicate a pitch.

The note length is information which numerically expresses a performance duration time of each note. In FIG. 6B, a ¼ note is expressed by 64, and a ⅛ note is expressed by 32 resulting from dividing 64 by 2. The note length may vary with the value of a reference note length.

The meta score time is information which relatively indicates a time at which each note starts to be performed based on the note length. In FIG. 6B, "1:00" is relative time information indicating when a first measure begins. Accordingly, referring to the meta score note ID and the note length at that time, it can be derived from that a note 74(D5) is performed at the beginning of the first measure during a length of 64. "1:64" indicates a time after the length of 64 from the beginning of the first measure. Referring to the meta score note ID and the note length at that time, it can be derived from that a note 67(G4) is performed at a time after the length of 64 from the beginning of the first measure during a length of 32. This translation method can be applied to "1:96", "1:128, and "1:160" in FIG. 6B. "2:00" indicates a time when the second measure begins.

The electronic score display unit 30 displays an electronic score on a screen based on the musical score or meta score information and extracts coordinates of all of the notes included in the electronic score. More specifically, as shown in FIG. 6D, the electronic score display unit 30 extracts the x-coordinate and y-coordinate of each note in order to indicate a predetermined area including the note head.

The note position manager 40 generates note position information by matching the notes and their coordinates extracted by the electronic score display unit 30 to the meta score information and manages the note position information. As shown in FIG. 6E, the note position information includes the score note ID of every note included in the electronic score, each note's meta score time, and each note's x- and y-coordinates.

The synchronization information manager 50 generates and manages synchronization information including every note included in the meta score information and each note's corresponding sync performance time, at which each of the notes is supposed to start to be performed. FIG. 6F shows an example of the format of synchronization information. Referring to FIG. 6F, the synchronization information includes a sync performance time, meta score time and meta score note ID of each of all notes included in the meta score information.

The synchronization information manager 50 may generate synchronization information from the meta score information or MIDI data, or may read a synchronization information file stored in advance and generate synchronization information referring to the synchronization information file.

In order to generate synchronization information from the meta score information, the synchronization information manager 50 receives the meta score information from the performance information manager 20, extracts the meta score time of each of the notes included in the meta score information, and calculates a sync performance time of each note based on the meta score time. In addition, the synchronization information manager 50 manages the meta score note ID and meta score time of each note, which is matched to the sync performance time, together with the sync performance time.

In order to generate synchronization information from the MIDI data, the synchronization information manager 50 detects a MIDI performance time of each note, which is included in the MIDI data, from the MIDI data and calculates a sync performance time of the note based on the MIDI performance time. In addition, the synchronization information manager 50 manages the meta score note ID and meta score time of each note, which is matched to the sync performance time, together with the sync performance time.

In order to generate synchronization information referring to a synchronization information file stored in advance, the synchronization information manager 50 selects and reads the synchronization information file to detect a sync performance time of each of the notes included in the meta score information. Then, the synchronization information manager 50 generates and manages synchronization information including the sync performance time, meta score time and meta score note ID of each note. Here, the synchronization information can be applied when a user wants to learn the execution of famous players. In other words, by displaying a performing state on the electronic score based on the synchronization information that is generated according to performance of a famous player, a trainee is allowed to learn the execution of the player.

The synchronous note designation unit 60 designates performing notes on the electronic score based on the note position information stored in the note position manager 40 and the synchronization information stored in the synchronization information manager 50.

The synchronous note designation unit 60 can use one of two methods in order to designate performing notes on the electronic score. In one method, the synchronous note designation unit 60 designate performing notes that are predicted based on the synchronization information stored in the synchronization information manager 50, regardless of real performance. In the other method, the synchronous note designation unit 60 receives real performance note information and designates the performed notes on the electronic score.

More specifically, when the synchronous note designation unit 60 operates regardless of real performance, it receives the synchronization information from the synchronization information manager 50 and the note position information from the note position manager 40, calculates performance duration times upon the start of performance, and continuously extracts notes, whose sync performance times in the synchronization information match up to the calculated performance duration times, from the synchronization information. Then, the synchronous note designation unit 60 extracts the coordinates of each of the extracted notes based on the note position information and designates each note at a position corresponding to the coordinates on the electronic score. In other words, the synchronous note designation unit 60 starts in response to the start of real performance but designates notes on the electronic score based on the sync performance time of each note, which is included in the synchronization information, regardless of whether real performing notes are input or not.

When designating real performance note information on the electronic score, the synchronous note designation unit 60 matches the synchronization information to the note position information as real performance progresses to analyze the positions of one or more current performing notes and designates the current performing notes on the electronic score according to the result of analysis. For this operation, the synchronous note designation unit 60 needs to further include a performing sound input unit 70 for receiving the sound performed in real time. The performing sound input through the performing sound input unit 70 may be live acoustic performing notes, MIDI signals generated from MIDI performance, or performance information of a wave file.

The synchronous note designation unit 60 receives the synchronization information and the note position information from the synchronization information manager 50 and the note position manager 40, respectively, calculates a performance duration time when real performing sound is received from the performing sound input unit 70, and extracts notes, whose sync performance times contained in the synchronization information match up to the performance duration time, from the synchronization information. Then, the synchronous note designation unit 60 extracts reference coordinates for the extracted notes based on the note position information. In the meantime, the synchronous note designation unit 60 analyzes the performing sound received from the performing sound input unit 70 to detect a sync performance time and one or more real performing pitches, calculates differences between the detected new sync performance times and previous sync performance times in the synchronization information, calculates differences between the real performing pitches and the corresponding notes in the synchronization information, and calculates the coordinates of the real performing pitches based on the reference coordinates and the calculated differences. In other words, the synchronous note designation unit 60 compares the sync performance times of the real performing pitches with the sync performance times extracted from the synchronization information so as to calculate differences therebetween and compares the calculated differences with x-coordinates that are extracted from the note position information with respect to the extracted notes so as to set the x-coordinates of the real performing pitches to be designated. In addition, the synchronous note designation unit 60 compares the pitches detected from the real performing sound with corresponding pitches inferred from the meta score note ID contained in the synchronization information so as to calculate differences therebetween and compares the calculated differences with y-coordinates that are extracted from the note position information with respect to the extracted notes so as to set y-coordinates of the real performing pitches to be designated. Then, the synchronous note designation unit 60 designates the real performing pitches at positions corresponding to the set x- and y-coordinates on the electronic score.

FIG. 1A is a schematic block diagram of an apparatus for designating performing notes according to a second embodiment of the present invention. Instead of generating synchronization information in advance of music performance, the apparatus shown in FIG. 1A generates synchronization information in real time when the music is performed and designates performing notes using the synchronization information.

Referring to FIG. 1A, the apparatus according to the second embodiment of the present invention includes a score input unit 10*a*, a performance information manager 20*a*, an electronic score display unit 30*a*, a note position manager 40*a*, a synchronization information manager 50*a*, a synchronous note designation unit 60*a*; and a performing sound input unit 70*a*.

The operations of most of the members shown in FIG. 1A are similar to those shown in FIG. 1. However, the second embodiment is different from the first embodiment in that performing sound input through the performing sound input unit 70*a* is transmitted to the synchronization information manager 50*a* in real time in order to generate the synchronization information.

Thus, detailed descriptions of the score input unit 10*a*, the performance information manager 20*a*, the electronic score display unit 30*a*, and the note position manager 40*a* will be omitted.

The performing sound input unit 70*a* receives performing sound in real time and transmits the performing sound to the synchronization information manager 50*a* and the synchronous note designation unit 60*a*. The performing sound input through the performing sound input unit 70 may be one or more real acoustic performing notes, MIDI signals generated from MIDI performance, or performance information of a wave file.

The synchronization information manager 50*a* analyzes the performing sound input through the performing sound input unit 70 to detect real performing pitches and their sync performance times. Then, the synchronization information manager 50*a* compares the detected pitches and their sync performance times with meta score information generated from the performance information manager 20*a* in order to generate synchronization information, which includes each note's meta score note ID, each note's meta score time, and each note's corresponding sync performance time at which each real performing note starts to be performed, in real time and manages the synchronization information.

Upon the start of music performance, the synchronous note designation unit 60*a* designates notes corresponding to real performing pitches on an electronic score based on the synchronization information and note position information.

Since the synchronization information is generated based on a real performing note, a performance duration time of the real performing note is the same as the sync performance time contained in the synchronization information. However, the pitch of the real performing note may be different from that contained in the synchronization information.

Accordingly, as described in the first embodiment, either a first method of designating performing notes on the electronic score, regardless of real performance, or a second method of receiving real performance note information and designates it on the electronic score can be used.

In the first method, the synchronous note designation unit 60*a* receives the synchronization information from the synchronization information manager 50*a* and the note position information from the note position manager 40*a*, calculates a performance duration time upon the start of performance, and extracts notes, whose sync performance times in the synchronization information match up to the calculated performance duration times, from the synchronization information. Then, the synchronous note designation unit 60*a* extracts the coordinates of each of the extracted notes based on the note position information and designates each note at a position corresponding to the coordinates on the electronic score.

In the second method, the synchronous note designation unit 60*a* receives the synchronization information and the note position information from the synchronization information manager 50*a* and the note position manager 40*a*, respectively, calculates a performance duration time when real performing sound is received from the performing sound input unit 70*a*, and extracts notes, whose sync performance times contained in the synchronization information match up to the performance duration times, from the synchronization information. Then, the synchronous note designation unit 60*a* extracts reference coordinates for the notes based on the note position information. In the meantime, the synchronous note designation unit 60*a* analyzes the performing sound received from the performing sound input unit 70*a* to detect new sync performance times and real performing pitches, calculates differences between the detected new sync performance times and previous sync performance times in the synchronization information, and calculates differences between the real performing pitches and corresponding notes' reference pitches in the synchronization information. In addition, the synchronous note designation unit 60*a* calculates the coordinates of the real performing pitches, based on the reference coordinates and the calculated differences, and designates the real performing notes at positions corresponding to the calculated coordinates on the electronic score.

FIG. 2 is a flowchart of a method of designating performing notes according to a first embodiment of the present invention.

Referring to FIG. 2, meta score information is detected from a musical score or MIDI data in step S210. The meta score information expresses particulars, which are referred to when the musical score is performed, according to a predetermined standard and has a structure shown in FIG. 6B. Next, an electronic score is displayed based on the musical score or the meta score information in step S220.

The coordinates of all notes included in the electronic score are extracted, and then the notes and their coordinates are matched to the meta score information so as to generate note position information in step S230. Here, a method of generating the note position information and the structure of the note position information are illustrated in FIGS. 6D and 6E and was described above when the operations of the electronic score display unit 30 and the note position manager 40 shown in FIG. 1 were explained, and thus description thereof will be omitted.

Synchronization information, which contains all notes included in the meta score information and each note's corresponding sync performance time at which each of the notes is supposed to start to be performed, is generated in step S240. A method of generating the synchronization information and the structure of the synchronization information was described above when the operation of the synchronization information manager 50 was explained with reference to FIGS. 1 and 6F, and thus description thereof will be omitted.

If music starts to be performed after generating the note position information and the synchronization information with respect to the musical score, performing notes are designated on the electronic score based on the note position information and the synchronization information in steps S250 through S270.

One of two methods can be used in order to designate performing notes on the electronic score, as described above when the operation of the synchronous note designation unit 60 shown in FIG. 1 was explained.

In one method, performing notes, which are predicted based on the synchronization information stored in advance, are designated on the electronic score regardless of real performance. In the other method, real performance note information is received and designated on the electronic score.

FIG. 2 shows processes performed in a case where the former method is used. Processes performed in a case where the latter method is used will be described later with reference to FIG. 3.

Figure 2A:
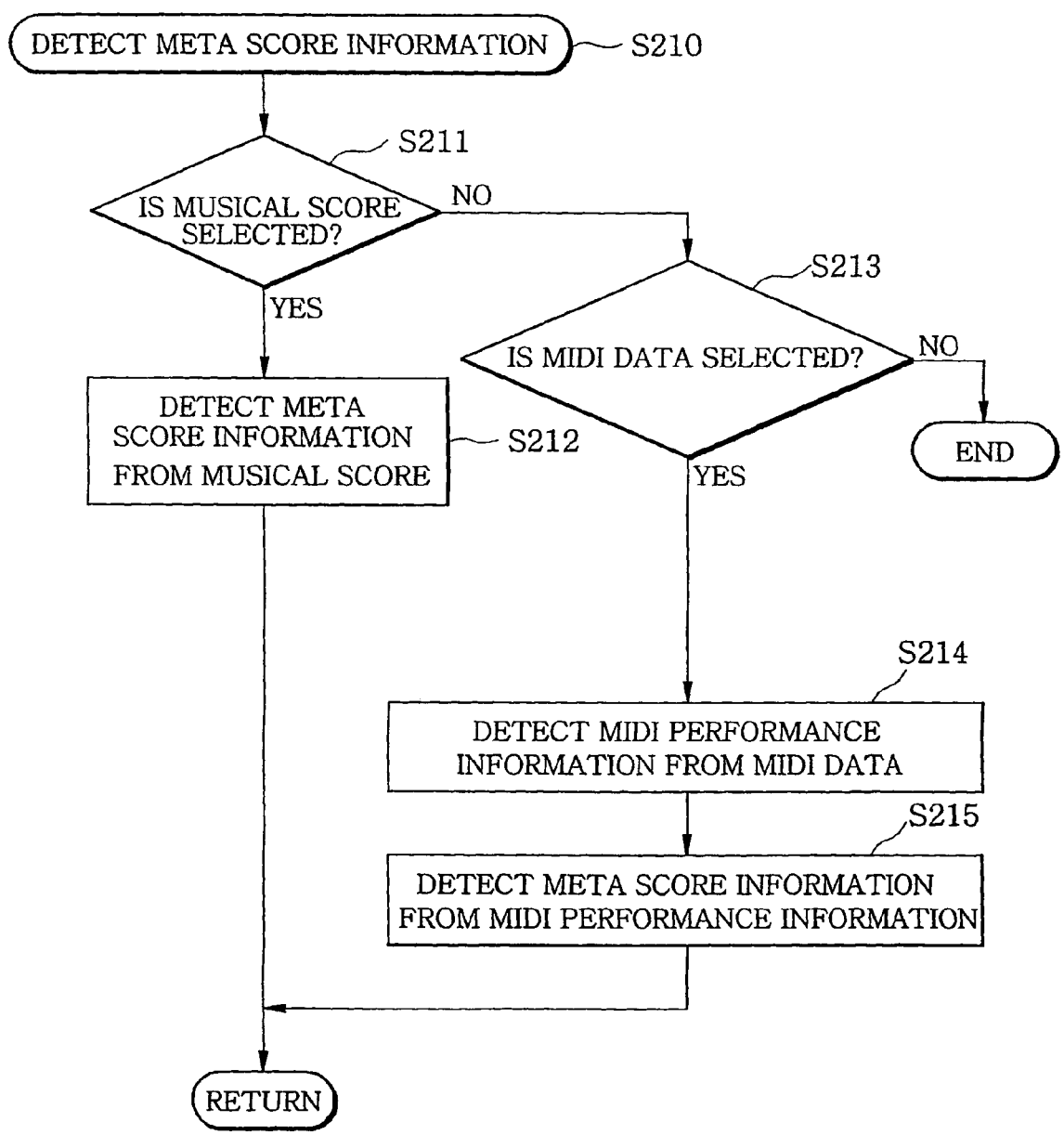
FIG. 2A is a flowchart of a procedure of detecting meta score information according to the first embodiment of the present invention.

FIG. 2A is a detailed flowchart of the step S210 of detecting meta score information. Referring to FIG. 2A, when a musical score is selected in step S211, meta score information is detected from the selected musical score in step S212. When MIDI data is selected in step S213, MIDI performance information is detected from the selected MIDI data in step S214, and meta score information is detected from the MIDI performance information in step S215.

Figure 2B:
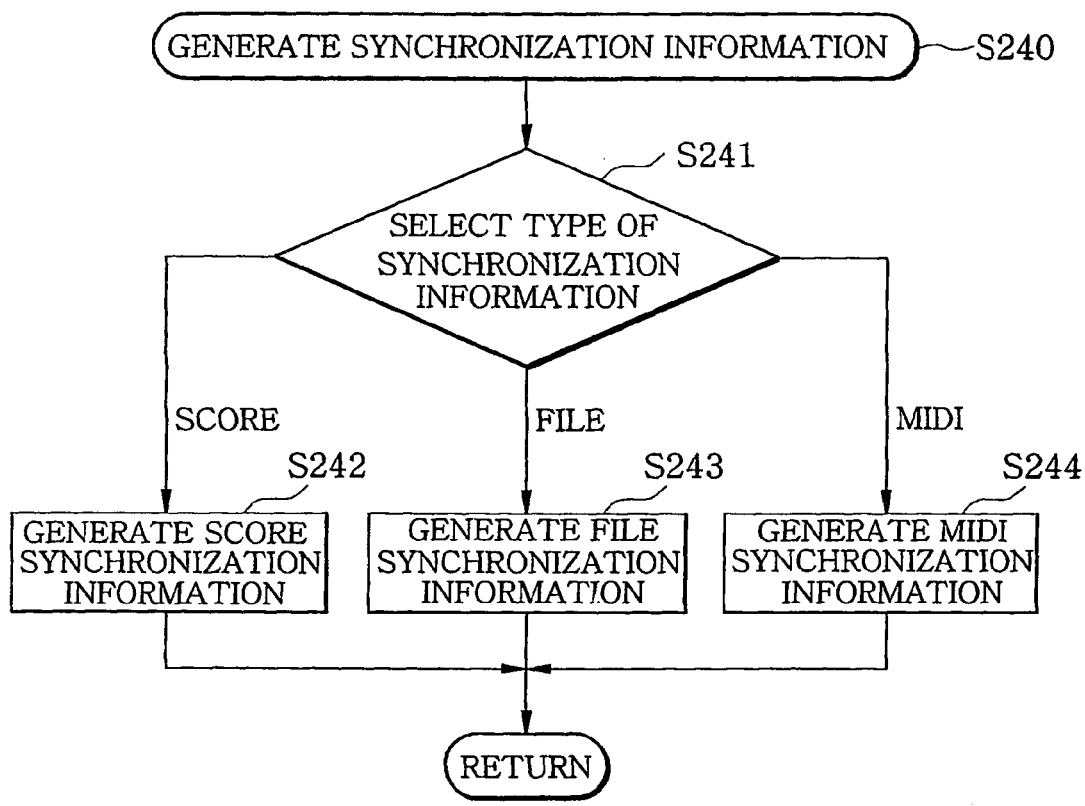
FIG. 2B is a flowchart of a procedure of generating synchronization information according to the first embodiment of the present invention.

FIG. 2B is a detailed flowchart of the step S240 of generating synchronization information. Referring to FIG. 2B, a type of synchronization information to be generated is selected in step S241. More specifically, the synchronization information can be divided into score synchronization information generated from the musical score to be performed, MIDI synchronization information generated from the MIDI data, and file synchronization information generated from a previously stored synchronization information file. One of the three types of synchronization information is selected.

If the score synchronization information type is selected in step S241, score synchronization information including the meta note ID of each note included in the meta score information, each note's meta score time, and each note's sync performance time, at which each note is supposed to start to be really performed, is generated based on a meta score time of the note in step S242. If the MIDI synchronization information type is selected in step S241, after detecting a MIDI performance time of each note included in the meta score information from the selected MIDI data, MIDI synchronization information including a sync performance time at which each note included in the MIDI data is supposed to start to be really performed, each note's meta score time, and each note's meta score note ID is generated based on the MIDI performance time of each note in step S244. If the file synchronization information type is selected in step S241, a synchronization information file is selected and read to generate a file synchronization information including a sync performance time of each note included in the meta score information, a meta score time of the note, and a meta score note ID of the note in step 243.

Figure 3:
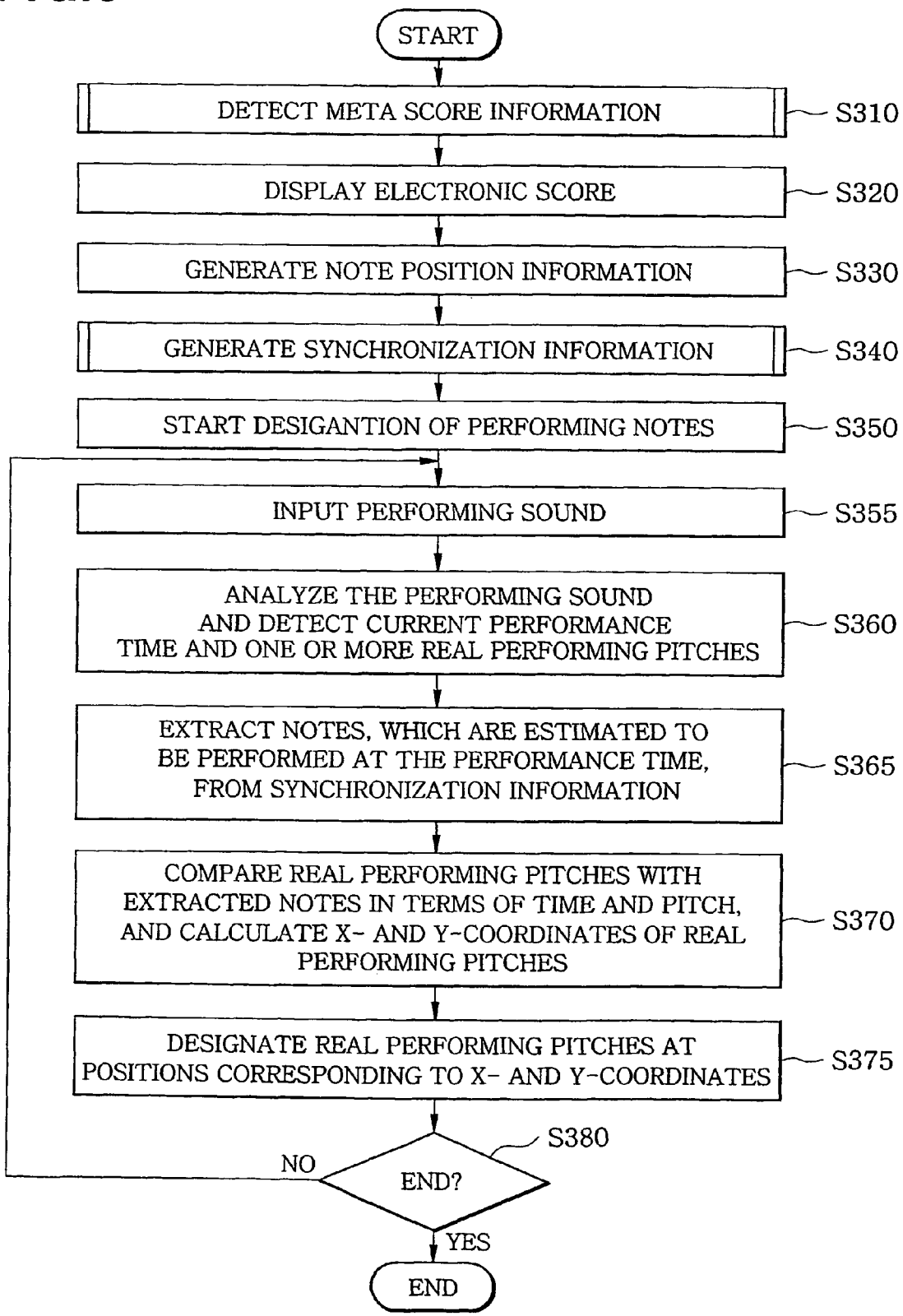
FIG. 3 is a flowchart of a method of designating performing notes according to a second embodiment of the present invention.

FIG. 3 is a flowchart of a method of designating performing notes according to a second embodiment of the present invention. FIG. 3 shows a designating procedure using the second method of receiving real performing sound and designating one or more real performing notes on the electronic score.

Referring to FIG. 3, meta score information, note position information, and synchronization information are generated from a musical score or MIDI data to be performed in steps S310 through S340. The steps S310 through S340 are similar to the steps S210 through S240 shown in FIG. 2, and thus detailed description thereof will be omitted.

If performing sound is input after generating the note position information and the synchronization information with respect to the musical score, one or more current performing notes are designated on the electronic score based on the note position information and the synchronization information in steps S350 through S380.

More specifically, if performing sound is input in step S355, the performing sound is analyzed to calculate a performance duration time at the instant the real performing sound starts to be performed and detect one or more real performing pitches in step S360. Notes, which are supposed to start to be performed at a time at which the calculated performance duration time has lapsed, are extracted from the synchronization information, which is generated in step S340, in step S365. In addition, the information about the real performing pitches, which are detected in step S360, is compared with information that is contained in the synchronization information with respect to the notes, which are extracted in step S365, thereby calculating the x- and y-coordinates of the real performing pitches in step S370. In other words, a sync performance time of the performing sound, which is detected in step S360, is compared with a sync performance time, which is contained in the synchronization information with respect to the notes extracted in step S365, thereby calculating the x-coordinates of the real performing pitches. In addition, the real performing pitches detected in step S360 are compared with meta score note IDs, which are contained in the synchronization information with respect to the notes extracted in step S365, thereby calculating the y-coordinates of the real performing pitches. If the sync performance time and the real performing pitches are the same as the sync performance time and pitches, which are contained in the previously generated synchronization information with respect to the extracted notes, the note position information is searched based on the sync performance time and the pitches to find the x- and y-coordinates corresponding to the sync performance time and the pitches.

Then, the real performing pitches are designated at positions corresponding to the x- and y-coordinates calculated in step S370. The steps S355 through S375 are repeated until the performance ends or an end command is input in step S380.

Figure 4:
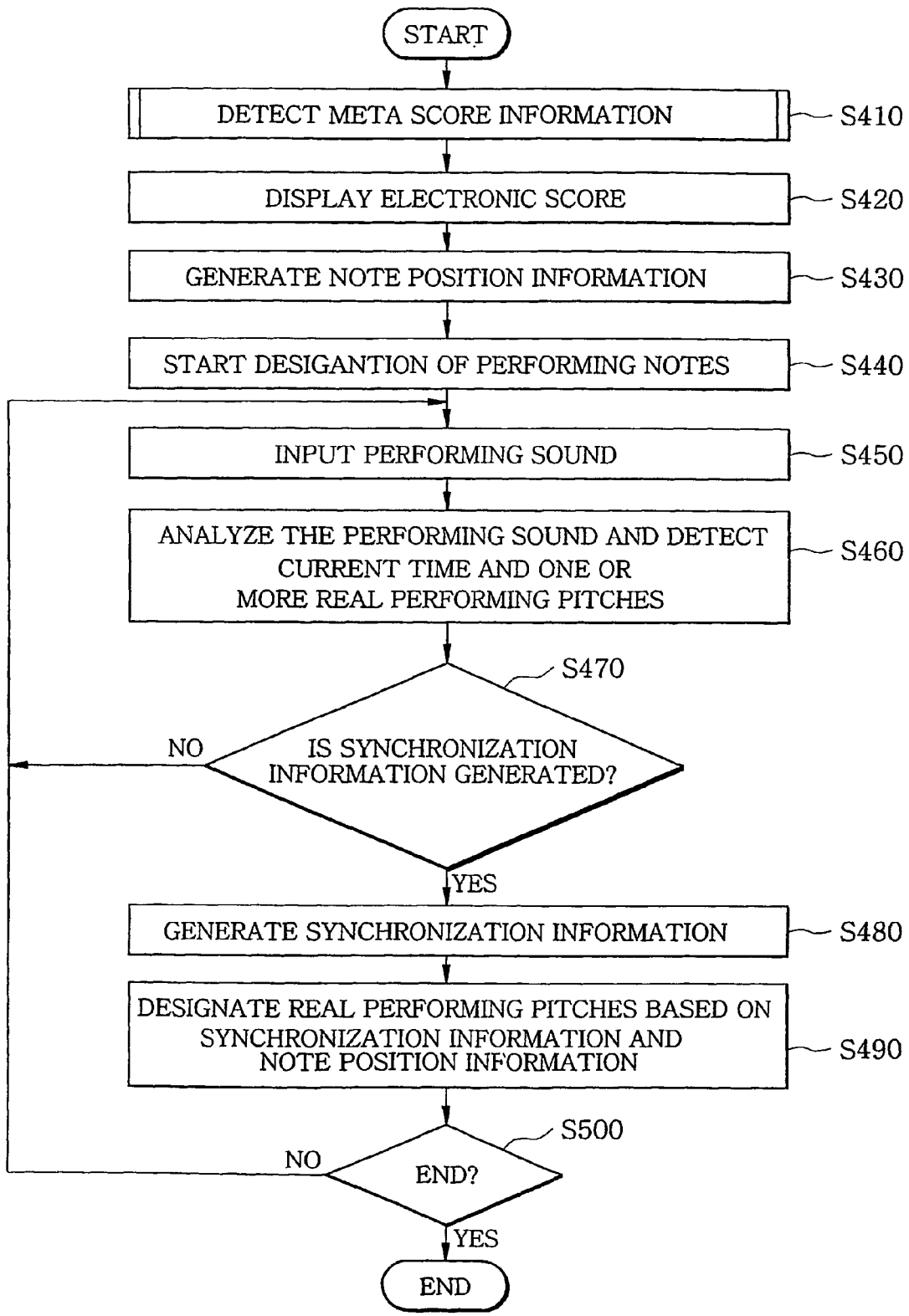
FIG. 4 is a flowchart of a method of designating performing notes according to a third embodiment of the present invention.
Figure 5:
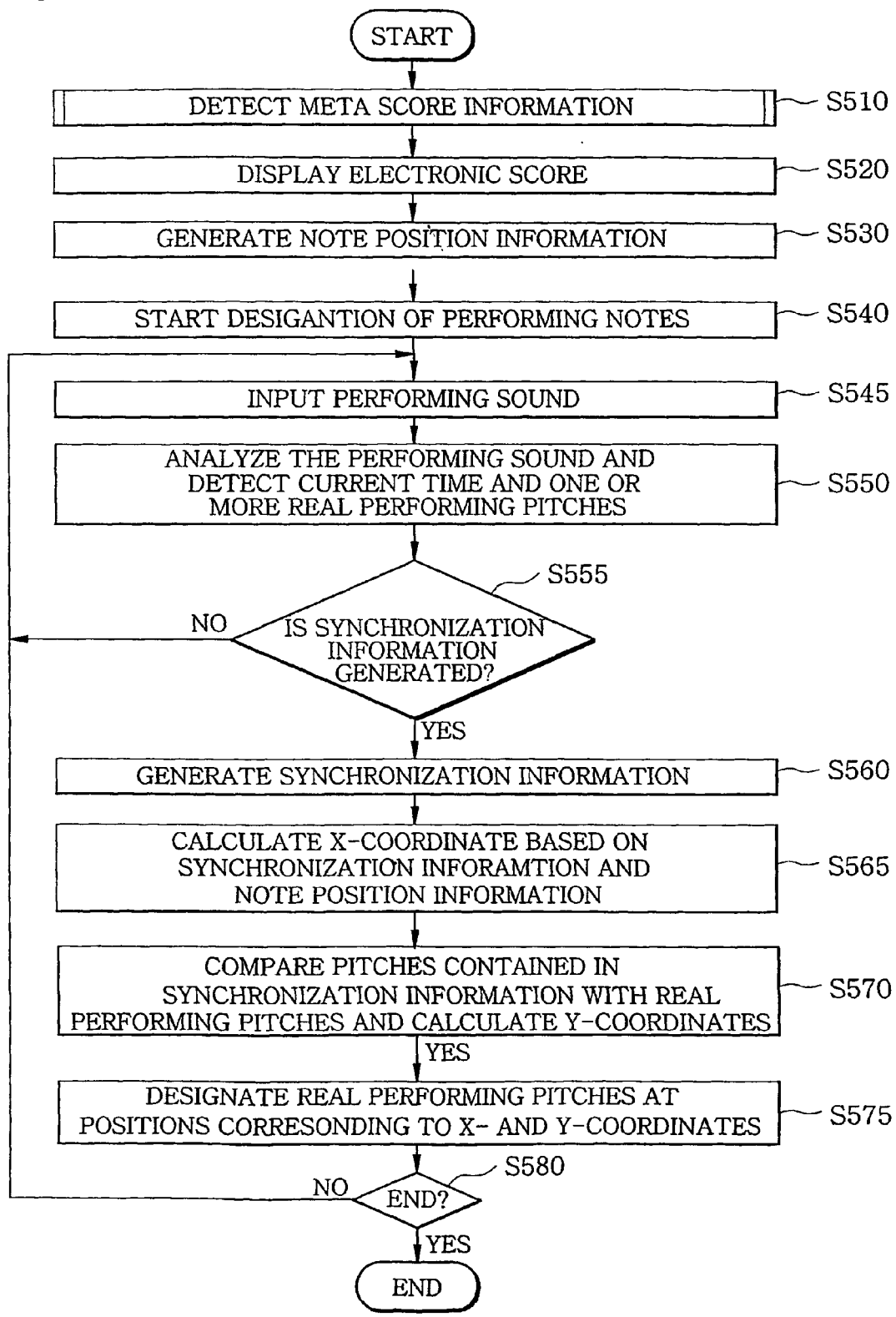
FIG. 5 is a flowchart of a method of designating performing notes according to a fourth embodiment of the present invention.

FIG. 4 is a flowchart of a method of designating performing notes according to a third embodiment of the present invention. FIG. 5 is a flowchart of a method of designating performing notes according to a fourth embodiment of the present invention.

FIGS. 4 and 5 show methods of designating performing notes using synchronization information that is generated in real time by analyzing input performing sound. FIG. 4 shows a method of designating one or more performing pitches using only synchronization information. FIG. 5 shows a method of designating one or more real performing pitches by comparing synchronization information with the result of analyzing the real performing sound.

Referring to FIG. 4, in the method according to the third embodiment of the present invention, meta score information is detected from a musical score or MIDI data in step S410. An electronic score is displayed in step S420. Note position information is generated in step S430. Here, the steps S410 through S430 are similar to the steps S210 through S230 shown in FIG. 2, and thus detailed description thereof will be omitted.

If a command to start designation of performing notes is input in step S440, and if performing sound is input in step S450, the performing sound is analyzed, thereby extracting a current sync performance time and one or more pitches of the real performing sound; notes, which are matching up to the real performing sound is extracted from the meta score information based on the sync performance time and the pitches; and synchronization information including the extracted notes and the corresponding sync performance time is generated, in steps S460 through S480. Here, the synchronization information includes each note's meta score note ID, each note's meta score time, and each note's corresponding sync performance time at which the real performing notes start to be performed. In other words, the synchronization information generated in the method shown in FIG. 4 has the same structure as that generated in the method shown in FIG. 2 or 3.

After the synchronization information is generated, the extracted notes are designated on the electronic score based on the synchronization information and the note position information in step S490. In other words, upon the start of performance, the coordinates of the notes, which are currently synchronized in steps S450 through S480, are extracted from the note position information; and the notes are designated at positions corresponding to the coordinates on the electronic score.

The steps S450 through S490 are repeated until the performance ends or an end command is input in step S500.

Referring to FIG. 5, in the method according to the fourth embodiment of the present invention, meta score information is detected from a musical score or MIDI data in step S510. An electronic score is displayed in step S520. Note position information is generated in step S530. Here, the steps S510 through S530 are similar to the steps S210 through S230 shown in FIG. 2, and thus detailed description thereof will be omitted.

If a command to start designation of performing notes is input in step S540, and if performing sound is input in step S545, the performing sound is analyzed, thereby extracting a sync performance time and pitches of the real performing sound; notes, which are matching up to the real performing sound are extracted from the meta score information based on the sync performance time and the pitches; and synchronization information including the extracted notes and the corresponding sync performance time is generated, in steps S550 through S560.

After the synchronization information is generated, the synchronization information is matched to the note position information, thereby calculating the x-coordinates of the real performing pitches in step S565. Meta score note IDs contained in the synchronization information are compared with the real performing pitches, thereby calculating the y-coordinates of the real performing pitches in step S570. Then, the real performing pitches are designated at positions corresponding to the x- and y-coordinates on the electronic score in step S575.

The steps S545 through S575 are repeated until the performance ends or an end command is input in step S580.

FIGS. 6A through 8F are diagrams for illustrating a procedure for designating performing notes according to the present invention.

Figure 6A:
FIGS. 6A through 9C are diagrams for illustrating procedures of designating performing notes according to the present invention.
Figure 6D:
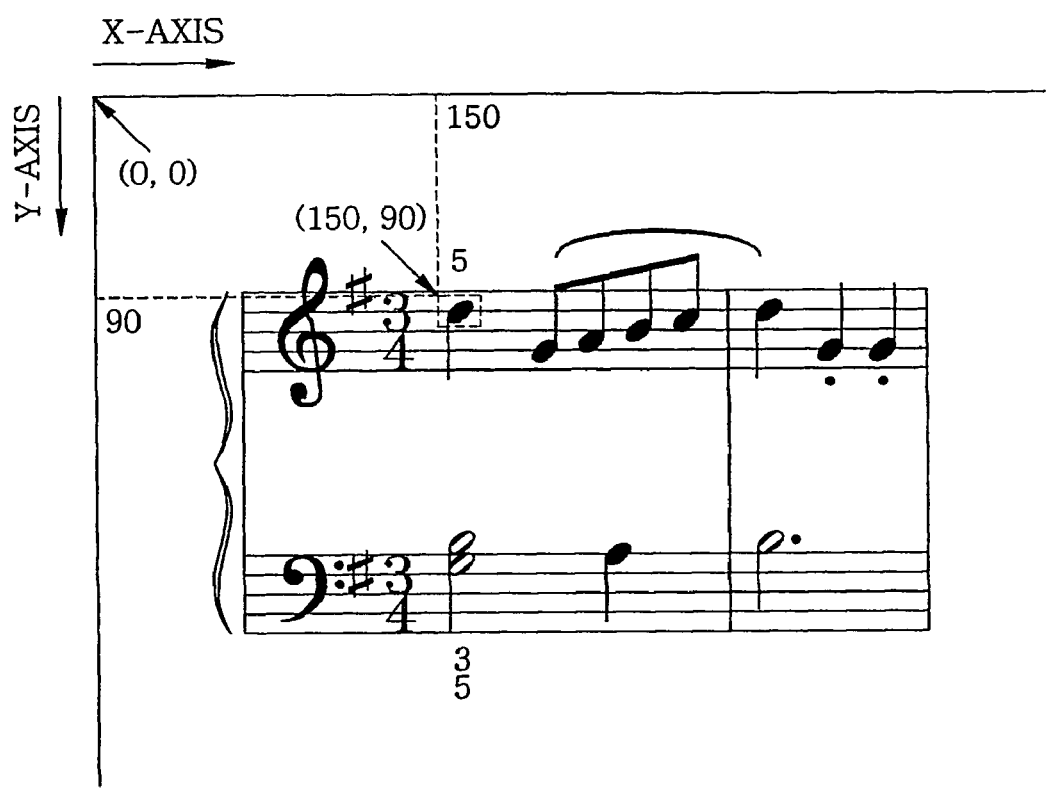

FIG. 6A is a diagram for illustrating the present invention and shows the musical score of the first two measures of the Minuet in G major by Bach. FIG. 6B shows a part of meta score information, which is detected form the musical score shown in FIG. 6A regarding right hand performance. FIG. 6C shows a part of meta score information, which is detected form the musical score shown in FIG. 6A regarding left hand performance.

FIG. 6D is a diagram for explaining a method of detecting the coordinates of each note from an electronic score which is displayed based on the musical score or the meta score information. Referring to FIG. 6D, the x- and y-coordinates of each note are set on the basis of an upper left point of a predetermined region of the note head. An example of note position information, which is generated through this detecting method, is shown in FIG. 6E.

FIG. 6F shows an example of synchronization information, which is generated from the meta score information shown in FIGS. 6B and 6C. Such synchronization information may be generated from meta score information, MIDI data commonly used in MIDI music, or a previously stored synchronization information file. Alternatively, synchronization information may be generated from live acoustic sound, MIDI signals from live performance on the MIDI instruments, or a wave file.

Figure 7B:
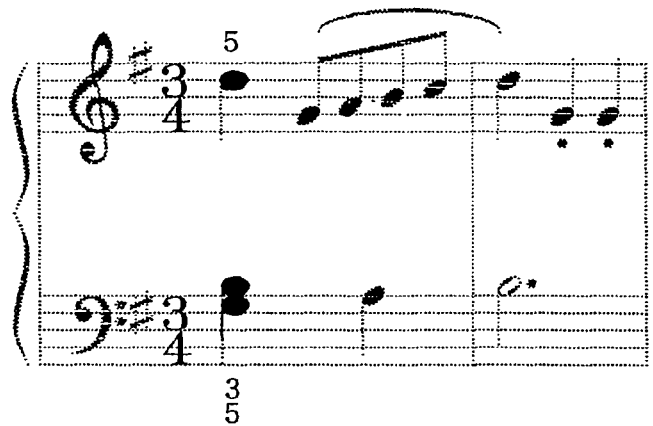

FIG. 7A shows synchronization information, meta score information, and note position information. FIGS. 7B through 7F show examples in which a current performing note is designated on an electronic score based on the synchronization information shown in FIG. 7A. In FIGS. 7B through 7F, a dim portion denotes an initial electronic score, and a dark portion denotes a position of a current performing note.

Figure 7C:
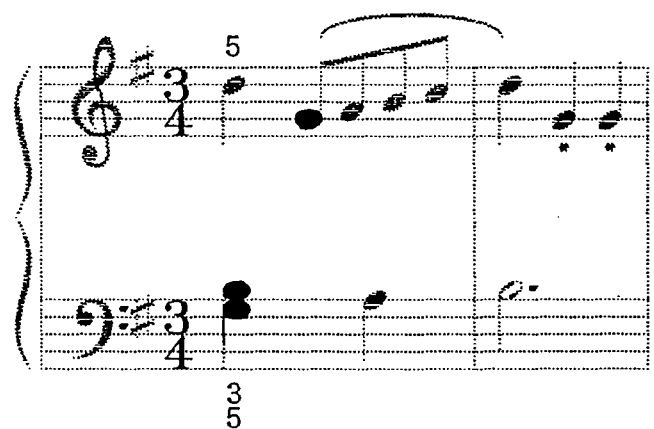
Figure 7D:
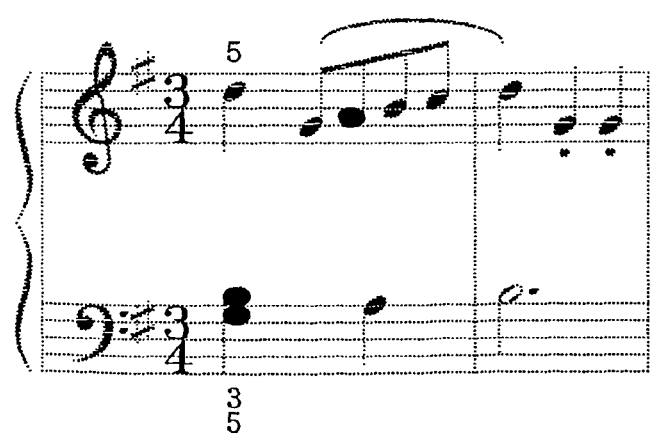
Figure 7E:
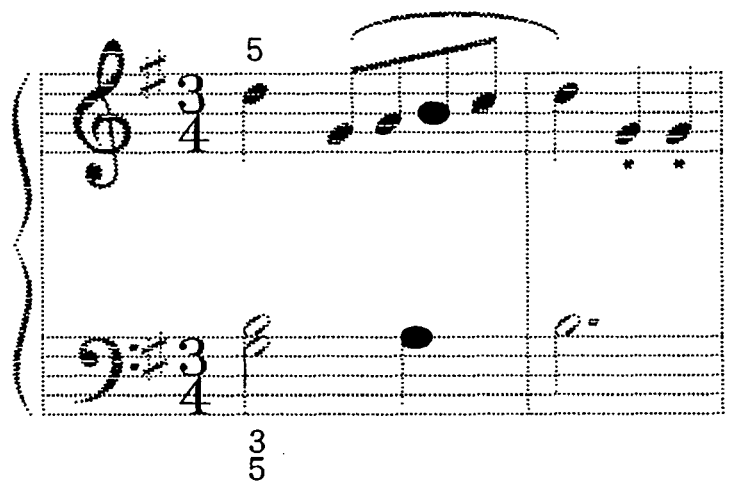
Figure 7F:
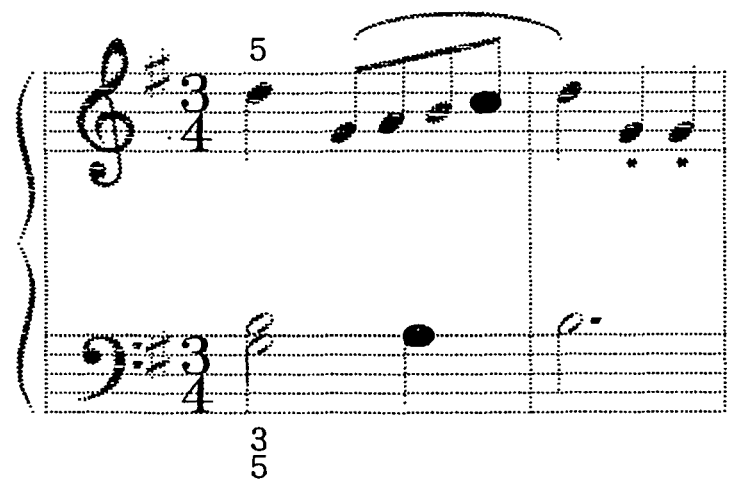

Referring to the synchronization information shown in FIG. 7A, at the beginning (0.000) of the music performance, notes 74(D5), 59(B3), and 55(G3) are simultaneously performed. They are designated on an electronic score, as shown in FIG. 7B. In addition, a note, 67(G4) is performed when it has been 1.000 second since the beginning of the music performance and is designated on the electronic score, as shown in FIG. 7C. A note 69(A4) is performed when it has been 1.500 seconds since the beginning of the music performance. Notes 71(B4) and 57(A3) are simultaneously performed when it has been 2.000 seconds since the beginning of the music performance. A note 72(C5) is performed when it has been 2.500 seconds since the beginning of the music performance. FIG. 7D shows an electronic score on which a current performing note is designated when it has been 1.500 seconds since the beginning of the music performance. FIG. 7E shows an electronic score on which current performing notes are designated when it has been 2.000 seconds since the beginning of the music performance. FIG. 7F shows an electronic score on which current performing notes are designated when it has been 2.500 seconds since the beginning of the music performance.

Here, the current performing notes designated on the electronic score are not related with the real music performance but are unconditionally designated at times which are estimated from the synchronization information.

Figure 8B:
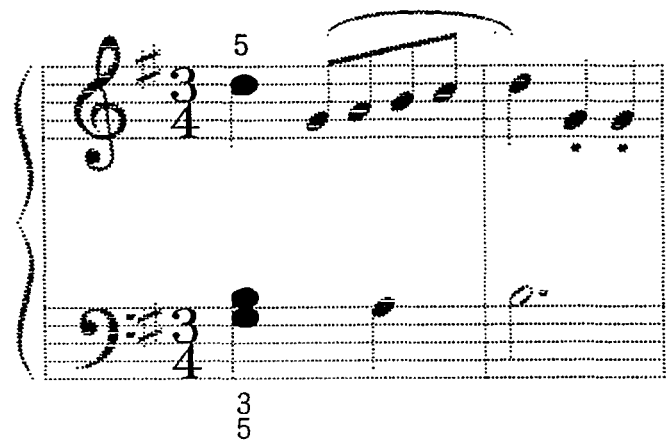

FIGS. 8A through 8F are diagrams for explaining an example of comparing real performing note information (an onset time and a pitch) with previously generated synchronization information. (a sync performance time and a meta score note ID) when a real performing note is input and designating a position of the real performing note on an electronic score. FIG. 8A shows synchronization information, meta score information, note position information, and real performing note information. FIGS. 8B through 8F show examples in which a current performing note is designated on an electronic score based on the synchronization information shown in FIG. 8A. In FIGS. 8B through 8F, a dim portion denotes an initial electronic score, and a dark portion denotes a position of a current performing note. Here, the accompaniment (left hand) part of the score is reproduced in the form of MIDI music, and the melody (right hand) part is really performed.

Figure 8C:
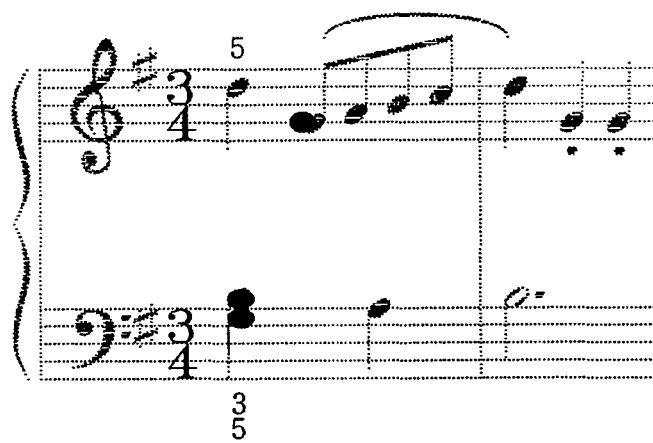

Referring to the synchronization information shown in FIG. 8A, it is supposed that a note 74(D5) is performed at the beginning (0.000) of music performance and that notes 59(B3) and 55(G3) are performed through reproducing of the MIDI music. In the mean time, referring to the real performing note information at the beginning of the music performance, a note 74(D5) is exactly performed at a time of 0.000. FIG. 8B shows an electronic score on which a note really performed at a time of 0.000, i.e., at the beginning of the music performance and notes corresponding to performing note information input through reproducing of the MIDI music are designated. Referring to the synchronization information shown in FIG. 8A, it is supposed that a note 67(G4) is performed when it has been 0.950 seconds since the beginning of the music performance. Referring to the real performing note information, a note 67(G4) is performed when it has been 0.900 seconds since the beginning of the music performance. In other words, a note is really performed 0.050 seconds earlier than a time of 0.950 that is supposed based on the synchronization information. Accordingly, as shown in FIG. 8C, a designated position of a current performing note is displaced to the left from a corresponding note on the electronic score. In other words, a less value than the x-coordinate of the note 67(G4) performed at the time of 0.950 in FIG. 8A is set as an x-coordinate of the designated performing note. When a sync performance time set by the synchronization information is different from an onset time of a real performing note, an x-coordinate is changed by Formula (1).

$$X = X_1 - ((X_1 - X_0) * (t_1 - t_r)) / (t_1 - t_0) \quad (1)$$

Here, X denotes an x-coordinate of a note based on an onset time $t_r$, $X_1$ denotes an x-coordinate of a current note based on a current sync performance time $t_1$ contained in the synchronization information, and $X_0$ denotes an x-coordinate of a previous note based on a previous sync performance time $t_0$ contained in the synchronization information.

Accordingly, the x-coordinate of the note that is designated on the electronic score shown in FIG. 8C based on the real performing note information is calculated by Formula (2).

$$X = 180 - ((180 - 150) * (0.950 - 0.900)) / (0.950 - 0.000)$$
$$\approx 178.4 \quad (2)$$

That is, in a case shown in FIG. 8C, the coordinates of a note designated as a current performing note are (178.4, 102).

Figure 8D:
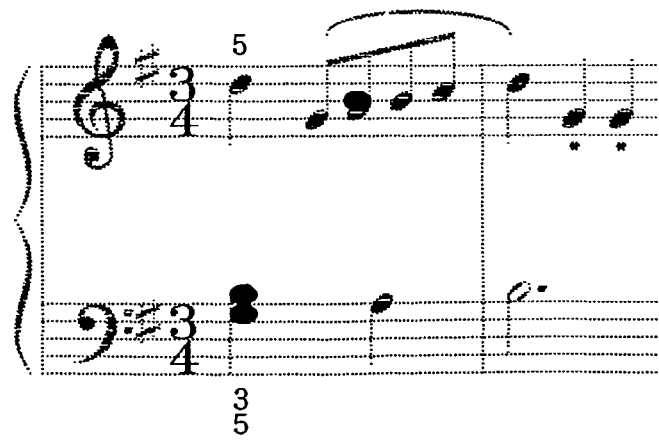

Referring to the synchronization information shown in FIG. 8A, it is supposed that a note 69(A4) is performed when it has been 1.450 seconds since the beginning of the music performance. Referring to the real performing note information, a note 71(B4) is performed when it has been 1.450 seconds since the beginning of the music performance. In other words, a note which is one tone higher than a note that is supposed to be performed based on the synchronization information is performed. Accordingly, as shown in FIG. 8D, a designated position of a current performing note is displaced upward by a space corresponding to one tone from a corresponding note on the electronic score. A difference in a y-coordinate between adjacent steps on a musical score has a predetermined value. Accordingly, when it is assumed that one tone is set to a value of 3, the y-coordinate of a note that is really performed at the time of 1.450 is 96, which is a value obtained by subtracting 3 from 99, i.e., the y-coordinate of the note 69(A4) supposed to be performed at the time of 1.450. In other words, in a case shown in FIG. 8D, the coordinates of a note designated as a current performing note are (200, 96).

The following description concerns the relationship between a pitch and a y-coordinate on a musical score. According to musical notation and analysis, a single octave is composed of seven notes, i.e., C, D, E, F, G, A, and B and five notes, i.e., C#, D#, F#, G#, and A#, among the 7 notes. In case of C major, the former seven notes are noted as they are and the latter five notes are noted using a sharp # or flat ♭. The twelve notes are 60(C4), 61(C4#) 62(D4), 63(D4#), 64(E4), 65(F4), 66(F4#), 67(G4), 68(G4#), 69(A4), 70(A4#), and 71(B4) in the forth octave. A one-tone difference between 60(C4) and 62(D4) and a half-tone difference between 64(E4) and 65(F4) are noted with the same space on a musical score. Accordingly, when a half-tone difference between mi and fa and a half-tone difference between ti and do are each noted with the same space as one step, the value of difference in y-coordinate, which was described above referring to FIG. 8D, is used to process these half-tone differences. Other half tones are noted by adding a sharp #, flat ♭, or neutral>to the front of a note head.

Figure 8E:
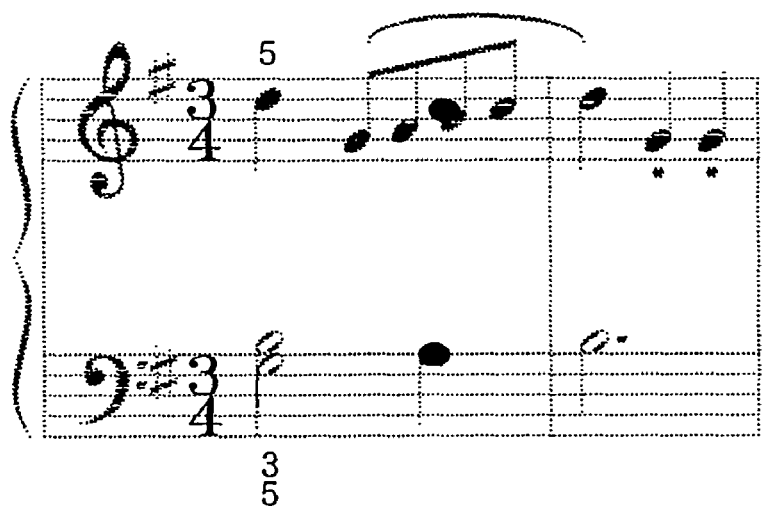

In a case shown in FIG. 8E, a half tone difference in pitch occurs between a designated position and a corresponding note position on the electronic score. Referring to the synchronization information shown in FIG. 8A, it is supposed that a note 71(B4) is performed when it has been 1.990 seconds since the beginning of the music performance. However, referring to the real performing note information, a note 72(C5) is performed when it has been 1.900 seconds since the beginning of the music performance. In other words, a note is really performed 0.090 seconds earlier and a half tone higher than a note that is supposed to be performed based on the synchronization information. Here, since a difference in pitch between 71(B4) and 72(C5) is half tone but is noted on a musical score in the same manner as one tone is noted, the value of 3 is applied to calculation of a y-coordinate. Accordingly, the position of a current performing note is designated as shown in FIG. 8E.

In other words, the x-coordinate of the current performing note is calculated as shown in Formula (3) referring to Formula (1), and the y-coordinate thereof is 93 that is obtained by subtracting 3 from 96.

$$X = 220 - ((220 - 200) * (1.990 - 1.900)) / (1.990 - 1.450)$$
$$\approx 216.7 \quad (3)$$

Accordingly, the coordinate of a note designated as the current performing note in FIG. 8E are (216.7, 93).

Figure 8F:
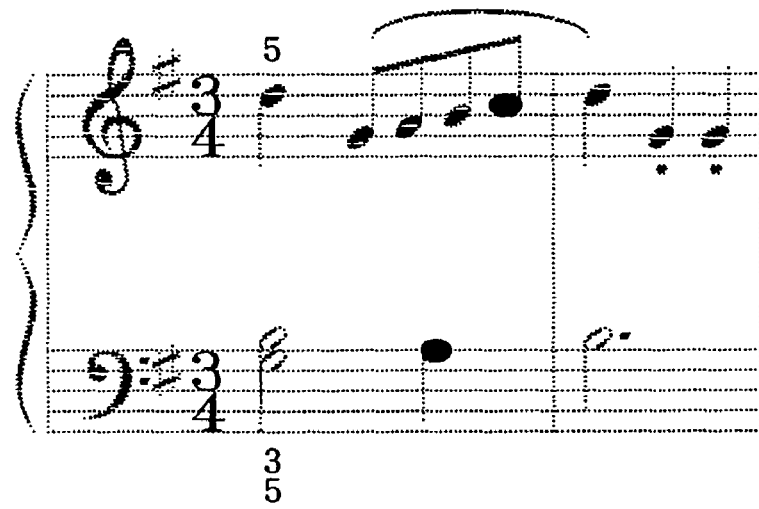

FIG. 8F shows a state in which a note 72(C5) is exactly performed when it has been 2.500 seconds since the beginning of the music performance.

Formula (1) used to change an x-coordinate is just an example, and other formulas for more effectively designating a current performing note can be used.

Figure 9B:
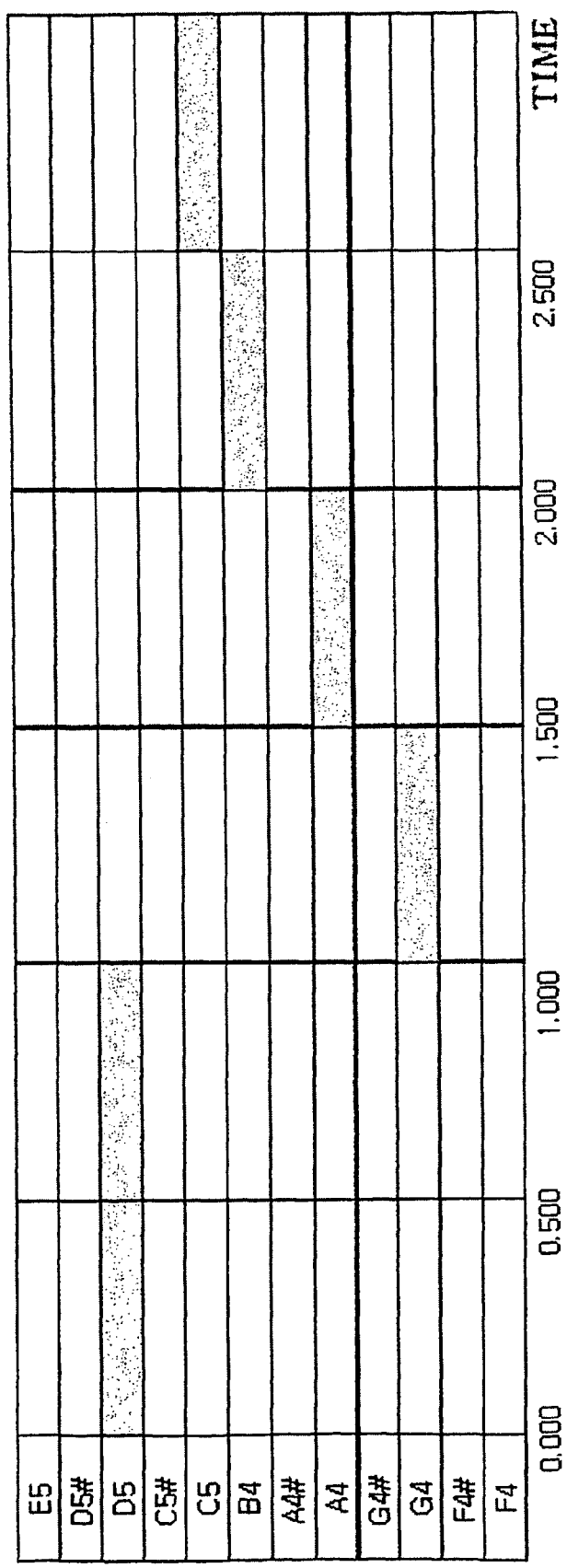
Figure 9C:
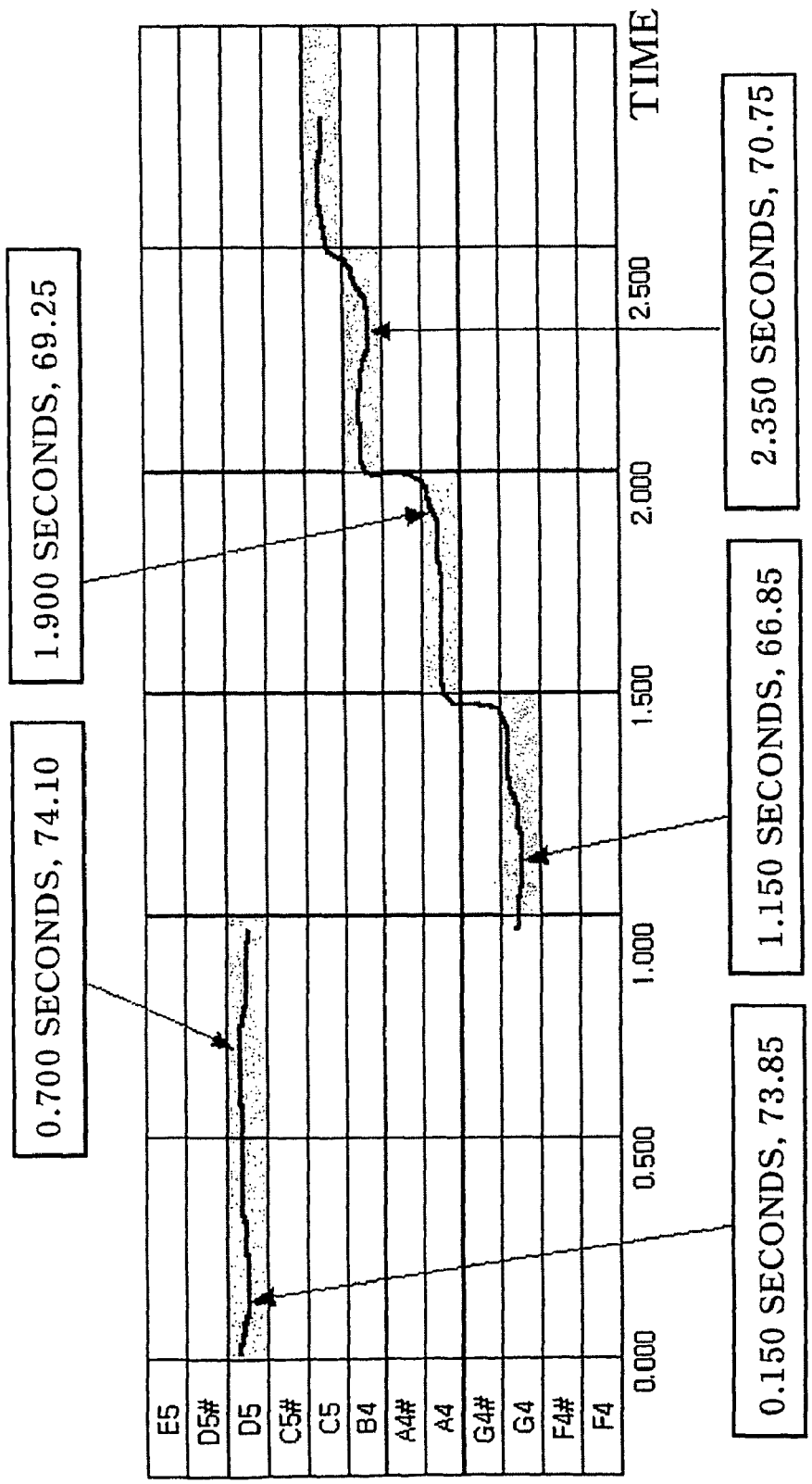

FIGS. 9A through 9C are diagrams for explaining an example of comparing real performing note information with previously generated synchronization information when a real performing note is input and designating a position of the real performing note on an electronic score having a different format from that shown in FIGS. 8B through 8F. FIG. 9A shows synchronization information, meta score information, and note position information shown in FIG. 7A. Here, the note position information corresponds to the new electronic score. FIG. 9B shows the electronic score before music is performed. In FIG. 9B, a region, which corresponds to each note and duration of the note, is shaded. FIG. 9C shows a state in which humming sound corresponding to a right hand part is analyzed in real time and subdivided pitches are designated on the electronic score as time flows. Here, like the example shown in FIGS. 8A through 8F, MIDI music is reproduced for a left hand part.

Referring to the synchronization information shown in FIG. 9A, it is supposed that notes 74(D5) is performed at the beginning (0.000) of music performance and that a note 67(G4) is performed when it has been 1.000 second since the beginning of the music performance. Continuously, it is supposed that notes 69(A4), 71(B4), and 72(C5) are performed when it has been 1.500, 2.000, and 2.500 seconds, respectively, since the beginning of the music performance. The electronic score according to the synchronization information shown in FIG. 9A is shown in FIG. 9B.

Since human humming sound does not have constant pitch and irregularly vibrates, the pitch of humming sound even for a single note slightly changes. Such changes in pitch are designated on the electronic score so that exactness of the human humming sound can be checked. FIG. 9C shows an example of designating humming sound for the purpose of checking the exactness of the humming sound. In FIG. 9C, a proper region of each note according to the synchronization information and pitch of real performing sound are shown.

More specifically, referring to FIG. 9C, the pitch is lowered from 74 to 73.85 when it has been 0.150 seconds since the beginning of performance and is then slightly raised up to 74.10 when it has been 0.700 seconds since the beginning. The pitch is 66.85 lower than 67 when it has been 1.150 seconds since the beginning. The pitch is 69.25 higher than 69 when it has been 1.900 seconds since the beginning and 70.75 lower than 71 it has been 2.350 seconds since the beginning. By analyzing the pitch of real performing sound and designating the analyzed result on the electronic score in real time, the exactness of the real performing sound can be easily checked.

The above description just concerns embodiments of the present invention. The present invention is not restricted to the above embodiments, and various modifications can be made thereto within the scope defined by the attached claims. For example, the shape and structure of each member specified in the embodiments can be changed.

INDUSTRIAL APPLICABILITY

A method and apparatus for designating performing notes based on synchronization information according to the present invention allow a user to easily and visually check the state of music performance while performing or listening to the music. Accordingly, an excellent training effect can be expected. In addition, live input sound is analyzed so as to designate the current notes' positions on an electronic score in real time so that the present invention can be used to estimate the performance of a player.

What is claimed is:

1. A method of designating performing notes based on synchronization information, the method comprising:
   a first step of detecting meta score information from a musical score;
   a second step of displaying an electronic score on a screen based on the musical score or the meta score information;
   a third step of extracting coordinates of all notes included in the electronic score and matching the notes and their coordinates to the meta score information so as to generate note position information;
   a fourth step of generating synchronization information, which comprises every note included in the meta score information and each note's corresponding sync performance time at which each of the notes is supposed to start to be performed; and
   a fifth of designating performing notes on the electronic score based on the note position information and the synchronization information when music starts to be performed.

2. The method of claim 1, wherein the first step comprises detecting the meta score information comprising the meta score note ID of each note included in the musical score, each note's length, and each note's meta score time, which relatively expresses a time, at which each note starts to be performed, based on note lengths that numerically express the performing lengths of the notes.

3. The method of claim 1, wherein the third step comprises generating the note position information by matching each note and its coordinate to the meta score information, and the note position information comprises each note's meta score note ID, each note's meta score time, and each note's x- and y-coordinates.

4. The method of claim 1, wherein the fourth step, the synchronization information comprises the meta score note ID of each note included in the meta score information, each note's meta score time, and sync performance time at which each note is supposed to start to be performed.

5. The method of claim 1, wherein the fourth step comprises the steps of:
   (4-1) selecting one type of synchronization information from score synchronization information generated from the musical score to be preformed, and file synchronization information generated from a previously stored synchronization information file;
   (4-2) if the score synchronization information is selected in step (4-1), generating score synchronization information which comprises the meta score note ID of each note included in the meta score information, each note's meta score time, and each note's sync performance time at which each note is supposed to start to be performed based on a meta score time of each note;
   (4-3) if the file synchronization information is selected in step (4-1), selecting and reading a synchronization information file to generate file synchronization information which comprises the meta score note ID of each note included in the synchronization information file, each note's meta score time, and each note's sync performance time.

6. The method of claim 1, wherein when performing notes are designated on the electronic score based on the synchronization information in the fifth step, the fifth step comprises calculating performance duration times upon the start of performance; continuously extracting notes, whose sync performance times in the synchronization information match up to the calculated performance duration times, from the synchronization information; extracting the coordinates of each of the extracted notes based on the note position information; and designating each note at a position corresponding to the extracted coordinates on the electronic score.

7. The method of claim 1, wherein when designating real performing pitches on the electronic score in the fifth step, the fifth step comprises the steps of:
   (5-1) calculating a performance duration time at the instant real performing sound starts to be performed mid analyzing one or more real performing pitches
   (5-2) extracting the notes, which are supposed to start to be performed at the instant the calculated performance duration time has lapsed since the beginning of the performance, from the synchronization information, generated in the fourth step;

(5-3) comparing a sync performance time, which is contained in the synchronization information with respect to the extracted notes, with the performance duration time corresponding to the real performing pitches, thereby calculating x-coordinates of the real performing pitches, and comparing the notes extracted in step (5-2) with the real performing pitches, thereby calculating y-coordinates of the real performing pitches; and (5-4) designating the real performing pitches at positions corresponding to the x- and y-coordinates calculated in step (5-3) on the electronic score.

8. A method of designating performing notes based on synchronization information the method comprising:

a first step of detecting meta score information from a musical score;

a second step of displaying an electronic score on a screen based on the musical score or the meta score information;

a third step of extracting coordinates of all notes included in the electronic score and matching the notes and their coordinates to the meta score information so as to generate note position information;

a fourth step of analyzing performing sound to extract current sync performance time and the pitches of real performing sound; extracting notes, which are matching up to the real performing sound, from the meta score information based on the sync performance time and the pitches; and generating synchronization information including the extracted notes and the corresponding sync performance time; and a fifth step of designating the extracted notes as current performing notes on the electronic score based on the synchronization information generated in the fourth step and the note position information generated in the third step.

9. The method of claim 8, wherein the first step comprises detecting the meta score information comprising the meta score note ID of each note included in the musical score, each note's length, and each note's meta score time, which relatively expresses a time, at which each note starts to be performed, based on note lengths that numerically express the performing lengths of the notes.

10. The method of claim 8, wherein the third step comprises generating the note position information by matching each note and its coordinates to the meta score information, and the note position information comprises each note's meta score note ID, each note's meta score time, and each note's x- and y-coordinates.

11. The method of claim 8, wherein in the fourth step, the synchronization information comprises the meta score note ID of each note included in the meta score information, each note's meta score time, and each note's sync performance time at which the extracted note starts to be performed.

12. The method of claim 8, wherein when a performing note is designated on the electronic score based on the synchronization information in the fifth step, the fifth step comprises calculating performance duration times upon the start of performance; extracting the notes, whose sync performance times in the synchronization information match up to the calculated performance duration times, from the synchronization information; extracting the coordinates of each of the extracted notes based on the note position information; and designating each note at a position corresponding to the extracted coordinates on the electronic score.

13. The method of claim 8, wherein when the real performing pitches are designated on the electronic score in the fifth step, the fifth step comprises the steps of:

(5-1) calculating the x-coordinate of each real performing pitch by matching the synchronization information generated in the fourth step to the note position information generated in the third step;

(5-2) calculating the y-coordinate of each real performing pitch by comparing the real performing pitch, which is analyzed in the fourth step, with the corresponding meta score note ID in the synchronization information; and (5-3) designating the real performing pitches on the electronic score based on the x- and y-coordinates calculated in steps (5-1) and (5-2), respectively.

14. An apparatus for designating performing notes based on synchronization information, the apparatus comprising:

a score input unit which inputs score information containing the notes and their lengths in a musical score to be performed;

a performance information manager which detects meta score information from the score information, stores, and manages the meta score information;

an electronic score display unit which displays an electronic score on a screen based on the musical score or meta score information and extracts coordinates of all of the notes included in the electronic score;

a note position manager which generates note position information by matching the notes and their coordinates extracted by the electronic score display unit to the meta score information and manages the note position information;

a synchronization information manager which generates and manages synchronization information including every note included in the meta score information and each note's corresponding sync performance time at which each note is supposed to start to be performed; and a synchronous note designation unit which designates performing notes on the electronic score based on the synchronization information and the note position information upon the start of music performance.

15. The apparatus of claim 14, wherein the performance information manager detects the meta score information comprising the meta score note ID of each note included in the musical score, each note's length, and each note's meta score time, which relatively expresses a time, at which each note starts to be performed, based on note lengths that numerically express the performing lengths of the notes.

16. The apparatus of claim 14, wherein the note position manager generates the note position information, which comprises the meta score note ID of each note in the electronic score, each note's meta score time, and each note's x- and y-coordinates, by matching each note and its coordinates to the meta score information.

17. The apparatus of claim 14, wherein the synchronization information manager receives the meta score information from the performance information manager, generates, and manages the synchronization information which comprises the meta score note ID of each note in the meta score information, each note's meta score time, and each note's corresponding sync performance time at which each note is supposed to start to be performed based on a meta score time of each note.

18. The apparatus of claim 14, wherein the synchronization information manager reads a selected synchronization information file to generate the synchronization information which comprises each note's meta score note ID, each note's meta score time, and each note's corresponding sync performance time.

19. The apparatus of claim 14, wherein the synchronous note designation unit receives the synchronization information from the synchronization information manager and the note position information from the note position manager; calculates performance duration times upon the start of performance; continuously extracts notes, whose sync performance times in the synchronization information match up to the calculated performance duration times, from the synchronization information; extracts the coordinates of each of the extracted notes based on the note position information; and designates each note at a position corresponding to the extracted coordinates on the electronic score.

20. The apparatus of claim 14, further comprising a performing sound input unit which receives performing sound, wherein the synchronous note designation unit receives the synchronization information and the note position information from the synchronization information manager and the note position manager, respectively; calculates a performance duration time when real performing sound is received from the performing sound input unit; extracts notes, whose sync performance times contained in the synchronization information match up to the performance duration time, from the synchronization information; extracts reference coordinates for the notes based on the note position information; analyzes the performing sound received from the performing sound input unit to detect new sync performance tunes and the real performing pitches; calculates differences between the detected new sync performance times and previous sync performance times in the synchronization information; calculates differences between the real performing pitches and the corresponding notes in the synchronization information; calculates the coordinates of the real performing pitches based on the reference coordinates and the calculated difference; and designating the real performing pitches on each position corresponding to the coordinates on the electronic score.

21. An apparatus for designating performing notes based on synchronization information, the apparatus comprising:

a score input unit which inputs score information containing the notes and their lengths in a musical score to be performed;

a performance information manager which detects meta score information from the score information, stores, and manages the meta score information;

an electronic score display unit which displays an electronic score on a screen based on the musical score or meta score information and extracts coordinates of all of the notes included in the electronic score;

a note position manager which generates note position information by matching the notes and their coordinates extracted by the electronic score display unit to the meta score information and manages the note position information;

a performing sound input unit which receives performing sound;

a synchronization information manager which generates and manages synchronization information including sync performance times and real performing pitches which are detected by analyzing the performing sound received through the performing sound input unit; and a synchronous note designation unit which designates performing notes on the electronic score based on the synchronization information and the note position information upon the start of music performance.

22. The apparatus of claim 21, wherein the performance information manager detects the meta score information comprising the meta score note ID of each note included in the musical score, each note's length, and each note's meta score time, which relatively expresses a time, at which each note starts to be performed, based on note lengths that numerically express the performing lengths of the notes.

23. The apparatus of claim 21, wherein the note position manager generates the note position information, which comprises the meta score note ID of each note in the electronic score, each note's meta score time, and each note's x- and y-coordinates, by matching each note and its coordinates to the meta score information.

24. The apparatus of claim 21, wherein the synchronization information manager analyzes the performing sound input through the performing sound input unit to detect real performing pitches and their sync performance times; compares the detected pitches and their sync performance times with meta score information received from the performance information manager in order to generate synchronization information, which includes each note's meta score note ID, each note's meta score time, and each note's corresponding sync performance time at which each of the real performing notes starts to be performed, in real time; and manages the synchronization information.

25. The apparatus of claim 21, wherein the synchronous note designation unit receives the synchronization information from the synchronization information manager and the note position information from the note position manager; calculates performance duration times upon the start of performance; continuously extracts notes, whose sync performance times in the synchronization information match up to the calculated performance duration times, from the synchronization information; extracts the coordinates of each of the extracted notes based on the note position information; and designates each note at a position corresponding to the extracted coordinates on the electronic score.

26. The apparatus of claim 21, wherein the synchronous note designation unit receives the synchronization information and the note position information from the synchronization information manager and the note position manager, respectively; calculates a performance duration time when real performing sound is received from the performing sound input unit; extracts notes, whose sync performance times contained in the synchronization information match up to the performance duration Lime, from the synchronization information; extracts reference coordinates for the notes based on the note position information; analyzes the performing sound received from the performing sound input unit to detect new sync performance times and real performing pitches; calculates differences between the detected new sync performance times and previous sync performance times in the synchronization information; calculates differences between the real performing pitches and corresponding notes' reference pitches in the synchronization information; calculates the coordinates of the real performing pitches based on the reference coordinates and the calculated differences; and designating the real performing pitches on positions corresponding to the coordinates on the electronic score.

* * * * *